(12) United States Patent
Zhang et al.

(10) Patent No.: US 10,295,205 B2
(45) Date of Patent: May 21, 2019

(54) GRAVITY-ASSISTED HEAT PIPE COOLING SOURCE COLD STORAGE SYSTEM AND CHILLER SET

(71) Applicant: NANJING CANATAL DATA-CENTRE ENVIRONMENTAL TECH. CO., LTD., Nanjing (CN)

(72) Inventors: Weixing Zhang, Nanjing (CN); Zongqin Zhang, Nanjing (CN); Yi Yuan, Nanjing (CN); Lingyun Wang, Nanjing (CN)

(73) Assignee: NANJING CANATAL DATA-CENTRE ENVIRONMENTAL TECH. CO., LTD., Nanjing (CN)

( * ) Notice: Subject to any disclaimer, the term of this patent is extended or adjusted under 35 U.S.C. 154(b) by 0 days.

(21) Appl. No.: 15/751,485

(22) PCT Filed: Jul. 1, 2016

(86) PCT No.: PCT/CN2016/088063
§ 371 (c)(1),
(2) Date: Feb. 9, 2018

(87) PCT Pub. No.: WO2017/045459
PCT Pub. Date: Mar. 23, 2017

(65) Prior Publication Data
US 2018/0195746 A1   Jul. 12, 2018

(30) Foreign Application Priority Data
Sep. 18, 2015 (CN) .......................... 2015 1 0596660

(51) Int. Cl.
*F24F 5/00* (2006.01)
*F24T 10/13* (2018.01)
(Continued)

(52) U.S. Cl.
CPC .......... *F24F 5/0021* (2013.01); *F24F 5/0046* (2013.01); *F24T 10/13* (2018.05);
(Continued)

(58) Field of Classification Search
CPC ...... F24F 5/0021; F24F 5/0017; F24F 5/0046; F25B 23/006; F24T 10/40; F24T 10/13;
(Continued)

(56) References Cited

U.S. PATENT DOCUMENTS

2014/0298829 A1\* 10/2014 Dobbs .................. F24F 5/0021
62/56

FOREIGN PATENT DOCUMENTS

CN   202328583 U    7/2012
CN   102759222 A   10/2012
(Continued)

*Primary Examiner* — Emmanuel E Duke
(74) *Attorney, Agent, or Firm* — Gokalp Bayramoglu

(57) ABSTRACT

A gravity-assisted heat pipe cooling source cold storage system and chiller set. The cold storage system includes a gravity-assisted heat pipe, a cold storage pool, a heat exchanging and cold condensing device, and a heat exchanger pipe. A lower end of the gravity-assisted heat pipe is arranged in the cold storage pool, and an upper end of the gravity-assisted heat pipe is arranged in the heat exchanging and cold condensing device. The heat exchanger pipe is buried underground, and includes a central pipe and a side pipe. Upper ends of the central pipe and the side pipes are communicated with an inlet and outlet of the heat exchanging and cold condensing device, respectively. Lower ends of the central pipe and the side pipes are communicated with each other. The system employs the heat exchanger pipe to provide a cooling source for the gravity-assisted heat pipe.

10 Claims, 3 Drawing Sheets

(51) Int. Cl.
    *F24T 10/40*     (2018.01)
    *F25B 23/00*     (2006.01)
    *F24T 10/00*     (2018.01)

(52) U.S. Cl.
    CPC ............ *F24T 10/40* (2018.05); *F25B 23/006*
        (2013.01); *F24T 2010/56* (2018.05); *Y02B*
        *10/40* (2013.01); *Y02E 10/125* (2013.01);
        *Y02E 60/147* (2013.01)

(58) Field of Classification Search
    CPC .... F24T 2010/56; Y02E 10/125; Y02E 10/44;
        Y02E 60/147; Y02B 10/40; Y02B 30/17
    See application file for complete search history.

(56) References Cited

FOREIGN PATENT DOCUMENTS

| | | |
|---|---|---|
| CN | 203147942 U | 8/2013 |
| CN | 103968607 A | 8/2014 |
| CN | 105115084 A | 12/2015 |
| CN | 205048614 U | 2/2016 |
| JP | H11182942 A | 7/1999 |
| WO | 2013017730 A1 | 2/2013 |

* cited by examiner

GRAVITY-ASSISTED HEAT PIPE COOLING SOURCE COLD STORAGE SYSTEM AND CHILLER SET

CROSS REFERENCE TO RELATED APPLICATIONS

This application is the national phase entry of International Application No. PCT/CN2016/088063, filed on Jul. 1, 2016, which is based upon and claims priority to Chinese Application No. 201510596660.5 filed on Sep. 18, 2015, the entire contents of which are incorporated herein by reference.

TECHNICAL FIELD

The invention relates to a gravity-assisted heat pipe cooling source cold storage system and chiller set.

BACKGROUND

In the prior art, data centers have higher requirements for the sustainable refrigerating capacity of chiller sets. When the external power supply fails, the UPS can be used for supplying power for IT equipment and generally can't supply power for air conditioning equipment which also has great power consumption, but it can supply power for draught fans, water pumps and other devices having small power consumption. Besides, in order to solve the problem of cold storage for data centers, the large-size cold storage tank having huge size and occupying huge space is added in the water system, and it brings troubles for heat insulation and load bearing; furthermore, such system is not energy-saving. It is considered in the viewpoints of providing cold after power failure and reducing the volume of cold storage equipment.

Therefore, a new cold storage system is needed to solve the above problems.

SUMMARY OF THE INVENTION

Purpose: The invention provides an energy-saving and high-efficiency gravity-assisted heat pipe cold storage system aiming at the defects of chiller sets in the prior art.

Technical solution: In order to solve the above technical problems, the gravity-assisted heat pipe cooling source cold storage system of the invention adopts the following technical solution: a gravity-assisted heat pipe cooling source cold storage system for a chiller set, the chiller set is provided with cold water pipes, and the cold storage system comprises a gravity-assisted heat pipe, a cold storage pool, a heat exchanging and cold condensing device and a heat exchanger pipe, a inlet and an outlet of the cold storage pool are parallel-connected with the cold water pipes of the chiller set, and connected or disconnected via control valves; the gravity-assisted heat pipe is a separating heat pipe, a evaporating segment of which is arranged in the cold storage pool and a condensing segment is arranged in the heat exchanging and cold condensing device to obtain the cold source; the heat exchanger pipe is buried underground, the heat exchanger pipe comprises a central pipe and side pipes, the upper ends of the central pipe and the side pipes are communicated with the inlet and outlet of the heat exchanging and cold condensing device via heat insulating pipes, respectively, the central pipe and the side pipes are in parallel, the side pipes are uniformly arranged outside the central pipe, the side pipes are separated from each other, the cross section of each side pipe is formed by three arcs with equal arc length and equal radius and connected sequentially to one another, the edges of the side pipes are connected with outer wall surface of the central pipe, and the arc surface of the side pipes far from the central pipe is coaxial with the central pipe.

Further, the cross section areas of the side pipes are all the same.

Further, the heat exchanging and cold condensing device is a water cooling device, air cooling device or spraying evaporation heat exchanging and cold condensing device.

Further, the sum of cross section areas of the side pipes is greater than the cross section area of the central pipe.

Further, the inner wall diameter of the central pipe is 40±0.5 mm, the entire outer diameter of the heat exchanger pipe is 80±0.5 mm, and the wall thicknesses of the central pipe and the side pipes are both 3±0.5 mm.

Further, the inner wall at the end close to the ground of the central pipe shall be heat-insulated or provided with a heat insulating pipe sleeve inside.

Further, the cross section area of the central pipe is 50-60% of the sum of the cross section areas of the side pipes. At that time, the heat exchange efficiency is higher.

Further, the cold storage system is applied for the chiller set, and the cold storage pool is parallel-connected to the chiller set. When the chiller set breaks down or has power failure, the cold storage pool can be used for sustainably providing the cold.

Further, the cold storage medium is stored in the cold storage pool, and the cold storage medium can be water, an ethanediol aqueous solution and a 35%~40% calcium chloride aqueous solution, or an aqueous solution containing 20%~40% decahydrate sodium sulfate and 15%~25% trihydrate sodium acetate, or an aqueous solution containing 20%~40% decahydrate sodium sulfate and 15%~30% calcium chloride. The cold storage medium has a phase-transition temperature of 5~20° C., so that its latent heat of phase change can be effectively used under the environment of higher temperature.

Beneficial effect: The gravity-assisted heat pipe cooling source cold storage system of the invention employs the heat exchanger pipe to provide cold source for the gravity-assisted heat pipe, and the heat exchanger pipe can make full use of the heat exchange area in the drilling well, so that the heat exchanger pipe can keep in contact with the well wall in a large area to effectively improve the cold absorption efficiency of the heat exchanger pipe. At the same time, owing to the equal radians of the arc surfaces of the side pipes, the pipe pressures of the side pipes can be uniformly distributed to prevent the side pipes from fracture and extend the service life of the side pipes.

The invention also discloses a chiller set for a gravity-assisted heat pipe cooling source cold storage system, by adopting the above gravity-assisted heat pipe cooling source cold storage system, the cold storage pool is parallel-connected to the chiller set.

Further, the cold storage pool is connected with the chiller set via a three-way valve. Such design can simply and conveniently realize controlling the medium to flow through the chiller set or the cold storage pool.

Beneficial effect: The chiller set for the gravity-assisted heat pipe cooling source cold storage system of the invention employs the gravity-assisted heat pipe cooling source cold storage system to provide the cold storage system for the chiller set, and, the gravity-assisted heat pipe cooling source cold storage system of the invention employs the heat exchanger pipe to provide the cold source for the gravity-assisted heat pipe, and the heat exchanger pipe can make full use of the heat exchange area in the drilling well, so that the heat exchanger pipe can keep in contact with the well wall in a large area to effectively improve the cold absorption efficiency of the heat exchanger pipe. At the same time, owing to the equal radians of the arc surfaces of the side pipes, the pipe pressures of the side pipes can be uniformly distributed to prevent the side pipes from fracture and extend the service life of the side pipes.

DETAILED DESCRIPTION OF THE EMBODIMENTS

The invention is further described by combining with the drawings and specific embodiments below, it shall be understood that these embodiments are only used for explaining the invention but not for limiting the range of the invention, and after reading the invention, the modification in various equivalent forms of the invention by the technicians of this field are all within the range defined by the claims attached to the application.

Figure 1:
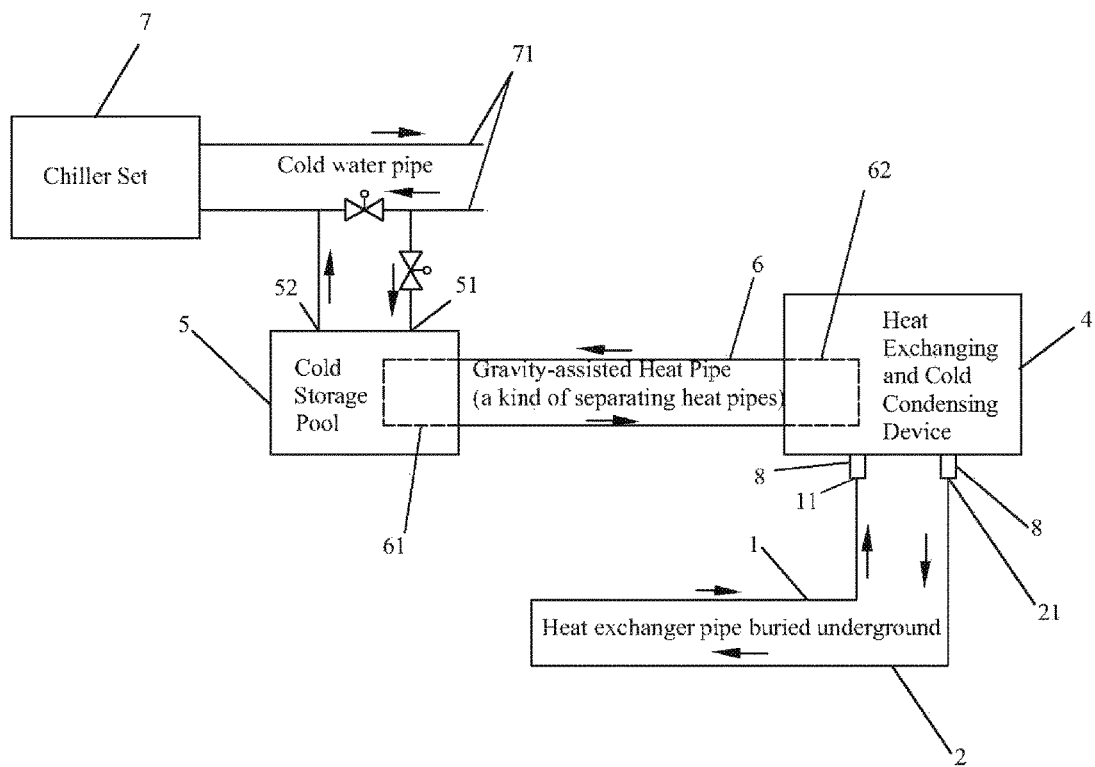
FIG. 1 shows the structural diagram of the gravity-assisted heat pipe cooling source cold storage system of the invention.
Figure 2:
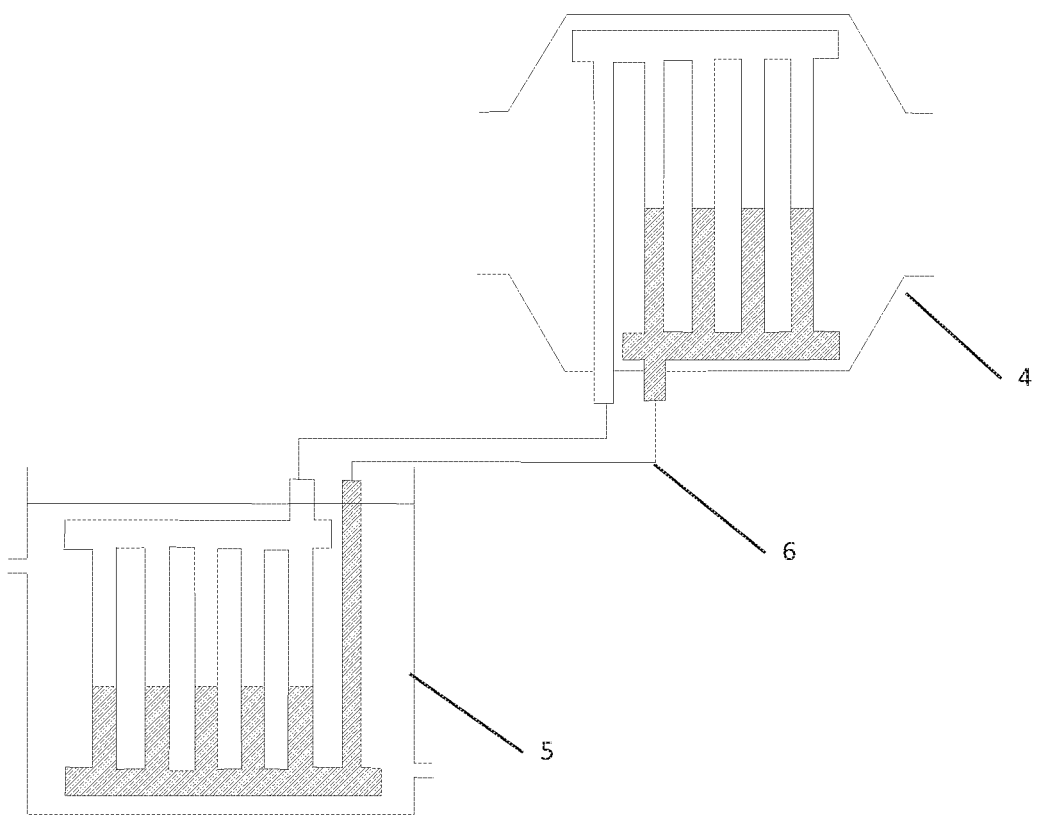
FIG. 2 shows the structural diagram of the gravity-assisted heat pipe of the invention.
Figure 3:
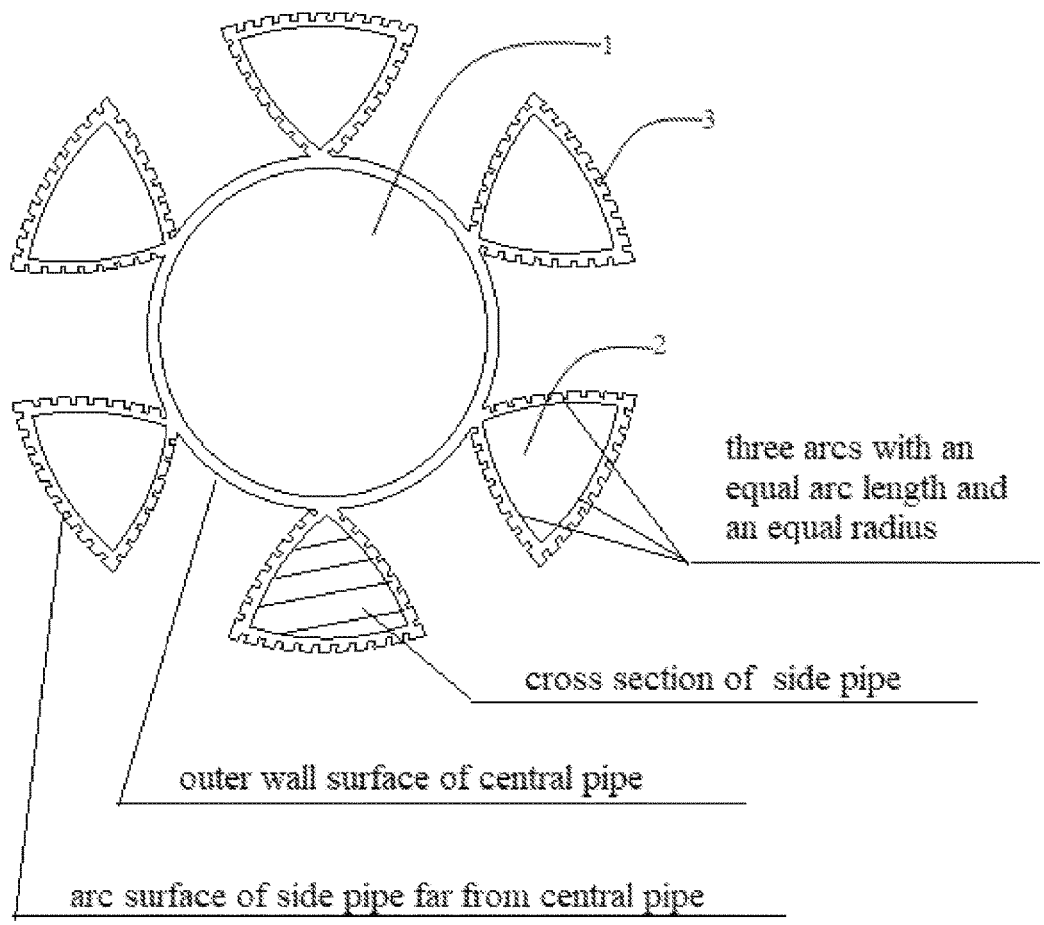
FIG. 3 shows the structural diagram of the heat exchanger pipe of the invention.

Please refer to FIG. 1, FIG. 2 and FIG. 3, in the gravity-assisted heat pipe cooling source cold storage system of the invention, the cold storage system is applied for the chiller set, and the chiller set is provided with cold water pipes. The cold storage system comprises a gravity-assisted heat pipe 6, a cold storage pool 5, a heat exchanging and cold condensing device 4 and a heat exchanger pipe, the lower end of the gravity-assisted heat pipe 6 is arranged in the cold storage pool 5, and the upper end of the gravity-assisted heat pipe 6 is arranged in the heat exchanging and cold condensing device 4. Wherein, the cold storage pool 5 is parallel-connected to the chiller set 4. When the chiller set breaks down or has power failure, the cold storage pool 5 can be used for sustainably providing the cold.

The inlet and outlet of the cold storage pool are parallel-connected with the cold water pipes of the chiller set, and connected or disconnected via control valves; the gravity-assisted heat pipe is a separating heat pipe, of which the evaporating segment is arranged in the cold storage pool and the condensing segment is arranged in the heat exchanging and cold condensing device to obtain the cold source; the heat exchanger pipe is buried underground.

The cold storage medium is stored in the cold storage pool 5, and the cold storage medium can be water, an ethanediol aqueous solution and a 35%~40% calcium chloride aqueous solution, or an aqueous solution containing 20%~40% decahydrate sodium sulfate and 15%~25% trihydrate sodium acetate, or an aqueous solution containing 20%~40% decahydrate sodium sulfate and 15%~30% calcium chloride. The cold storage medium has a phase-transition temperature of 5~20° C., so that its latent heat of phase change can be effectively used under the environment of higher temperature.

The heat exchanger pipe of the invention is buried underground, and comprises a central pipe 1 and side pipes 2, the upper ends of the central pipe 1 and the side pipes 2 are communicated with the inlet and outlet of the heat exchanging and cold condensing device 4 via heat insulating pipes to form circulation, respectively, so as to provide the cold water as the cooling source of cold condensation for the heat exchanging and cold condensing device. The central pipe 1 has the circular cross section, the side pipes 2 and the central pipe 1 are in parallel, the side pipes 2 are uniformly arranged outside the central pipe 1, the side pipes 2 are separated from each other, the cross section of each side pipe 2 is formed by three arcs with equal arc length and equal radius and connected sequentially to one another, the edges of the side pipes 2 are connected with outer wall surface of the central pipe 1, and the arc surface of the side pipes 2 far from the central pipe 1 is coaxial with the central pipe 1. Wherein, the side pipes 2 are flow inlet pipes, and the central pipe 1 is a flow return pipe. above design enables the heat exchanger pipe to make full use of the heat exchange area in the drilling well, so that the heat exchanger pipe can keep in contact with large area of the well wall to effectively improve the cold absorption efficiency of the heat exchanger pipe. In the embodiment, the side pipes 2 are separated from each other without contact. The cross section areas of the side pipes 2 are all the same. The sum of cross section areas of the side pipes 2 is greater than the cross section area of the central pipe 1. The design can greatly reduce the pipe pressure of the flow inlet pipe of the heat exchanger pipe. It can ensure the fluid flowing in to flow slowly, stay for long and absorb more heat. Owing to the small backflow cross section area, the fluid after heat exchange at the bottom can rapidly return to the ground to avoid the return fluid from the heat interference by the flow inlet pipe. Preferably, the cross section of the central pipe 1 is 50-60% of the sum of the cross section areas of the side pipes 1.

Preferably, grooves 3 are arranged on the outer pipe walls of the side pipes 2. The grooves 3 can be arranged along the axial direction of the side pipes 2. Wherein, the grooves 3 are uniformly distributed on the outer pipe walls of the side pipes 2. The lengths of the grooves 3 are the same as the lengths of the side pipes 2. The grooves 3 arranged on the side pipes 2 are used for increasing the surface areas of the side pipes 2, so that they can absorb heat more efficiently to improve the heat exchange efficiency of the heat exchanger pipe. It can make full use of the heat exchange area in the drilling well, so that the heat exchanger pipe can keep in contact with large area of the well wall to effectively improve the cold absorption efficiency of the heat exchanger pipe. The inner wall at the end close to the ground of the central pipe 1 shall be heat-insulated or provided with heat insulating pipe sleeve. For the part close to the ground surface, there is great heat interference between the flow inlet pipe and the flow return pipe, and the heat exchange efficiency can be improved by insulating the contact surface of the cavity at the upper end close to the ground of the flow return pipe or inserting a heat-insulating sleeve. In order to ensure the service life longer than 50 years, the heat exchanger pipe shall be made of high-density polyethylene or polypropylene. The inner wall diameter of the central pipe 1 is 40±0.5 mm, the entire outer diameter of the heat exchanger pipe is 80±0.5 mm, and the wall thicknesses of the central pipe 1 and the side pipes 2 are both 3±0.5 mm.

The invention also discloses a chiller set for gravity-assisted heat pipe cooling source cold storage system, by adopting the above gravity-assisted heat pipe cooling source cold storage system, the cold storage pool 5 is parallel-connected to the chiller set. The cold storage pool 5 is connected with the chiller set via a three-way valve. Such design can simply and conveniently realize controlling the medium to flow through the chiller set or the cold storage pool.

The invention mainly lies in the refrigerating mode of the cold condensing segment of the separating heat pipe, the heat exchanger pipe introduces the underground cold water to cool the cold condensing segment, and at the same time, the structural improvement of the heat exchanger pipe increases the heat exchange efficiency.

The chiller set for gravity-assisted heat pipe cooling source cold storage system of the invention employs the gravity-assisted heat pipe cooling source cold storage system to provide the cold storage system for the chiller set, besides, the gravity-assisted heat pipe cooling source cold storage system of the invention employs the heat exchanger pipe to provide the cold source for the gravity-assisted heat pipe, and the heat exchanger pipe can make full use of the heat exchange area in the drilling well, so that the heat exchanger pipe can keep in contact with large area of the well wall to effectively improve the cold absorption efficiency of the heat exchanger pipe. At the same time, owing to the equal radians of the arc surfaces of the side pipes, the pipe pressures of the side pipes can be uniformly distributed to prevent the side pipes from fracture and extend the service life of the side pipes.

The Principles are as Below:

Process of cold storage: When the temperature of the heat exchanging and cold condensing device 4 is lower than the set value, the gravity-assisted heat pipe 6 starts to operate, the secondary refrigerant circulates between the outdoor heat exchanging and cold condensing device and the cold storage pool 5 by discharging heat in the heat exchanging and cold condensing device 4 and absorbing heat in the cold storage pool 5, so that the temperature of the cold storage medium in the cold storage pool 5 is reduced, and even the refrigerant medium has phase change to store heat.

Process of releasing cold: When it is necessary to release cold, open the on-off valve to enable the inflow water into the chiller set to firstly flow through the cold storage pool 5, the water and the medium in the cold storage pool 5 exchanges heat to reduce the water temperature of the chiller set. The process of releasing cold is realized.

The chiller set for the gravity-assisted heat pipe 6 cooling source cold storage system of the intervention employs the heat exchanger pipe to provide the cold source for the gravity-assisted heat pipe 6, and the heat exchanger pipe can make full use of the heat exchange area in the drilling well, so that the heat exchanger pipe can keep in contact with large area of the well wall to effectively improve the cold absorption efficiency of the heat exchanger pipe. At the same time, owing to the equal radians of the arc surfaces of the side pipes, the pipe pressures of the side pipes can be uniformly distributed to prevent the side pipes from fracture and extend the service life of the side pipes.

The invention claimed is:

1. A cold storage system for a chiller set, the chiller set is provided with cold water pipes,
    wherein the cold storage system comprises a gravity-assisted heat pipe, a cold storage pool, a heat exchanging and cold condensing device and a heat exchanger pipe, an inlet and an outlet of the cold storage pool are parallelly connected with the cold water pipes of the chiller set, and are connected or disconnected via control valves; the gravity-assisted heat pipe is a separating heat pipe, an evaporating segment of the gravity-assisted heat pipe is arranged in the cold storage pool and a condensing segment is arranged in the heat exchanging and cold condensing device to obtain a cold source; the heat exchanger pipe is buried underground, the heat exchanger pipe comprises a central pipe and side pipes, upper ends of the central pipe and the side pipes are connected communicated with the inlet and the outlet of the heat exchanging and cold condensing device via heat insulating pipes, the central pipe and the side pipes are in parallel, the side pipes are uniformly arranged outside the central pipe, the side pipes are separated from each other, a cross section of each side pipe is formed by three arcs with an equal arc length and an equal radius and connected sequentially to one another, edges of the side pipes are connected with outer wall surface of the central pipe, and an arc surface of the side pipes far from the central pipe is coaxial with the central pipe.

2. The cold storage system according to claim 1, wherein cross section areas of the side pipes are all the same.

3. The cold storage system according to claim 1, wherein the heat exchanging and cold condensing device is a water cooling device, an air cooling device or a spraying evaporation heat exchanging and cold condensing device.

4. The cold storage system according to claim 1, wherein sum of cross section areas of the side pipes is greater than a cross section area of the central pipe.

5. The cold storage system according to claim 1, wherein an inner wall diameter of the central pipe is 40±0.5 mm, an entire outer diameter of the heat exchanger pipe is 80±0.5 mm, and a wall thicknesses of the central pipe and the side pipes are both 3±0.5 mm.

6. The cold storage system according to claim 1, wherein an inner wall of the central pipe at the end close to the ground is heat-insulated or provided with a heat insulating pipe sleeve inside.

7. The cold storage system according to claim 1, wherein a cross section area of the central pipe is 50-60% of the sum of a cross section areas of the side pipes.

8. The cold storage system according to claim 1, wherein a cold storage medium is stored in the cold storage pool, and the cold storage medium is water, an ethanediol aqueous solution and a 35%~40% calcium chloride aqueous solution, or an aqueous solution containing 20%~40% decahydrate sodium sulfate and 15%~25% trihydrate sodium acetate, or an aqueous solution containing 20%~40% decahydrate sodium sulfate and 15%~30% calcium chloride.

9. A chiller set for a cold storage system,
    wherein the cold storage system comprises a gravity-assisted heat pipe, a cold storage pool, a heat exchanging and cold condensing device and a heat exchanger pipe, an inlet and an outlet of the cold storage pool are parallelly connected with the cold water pipes of the chiller set, and are connected or disconnected via control valves; the gravity-assisted heat pipe is a separating heat pipe, an evaporating segment of the gravity-assisted heat pipe is arranged in the cold storage pool and a condensing segment is arranged in the heat exchanging and cold condensing device to obtain a cold source; the heat exchanger pipe is buried underground, the heat exchanger pipe comprises a central pipe and side pipes, upper ends of the central pipe and the side pipes are connected with the inlet and the outlet of the heat exchanging and cold condensing device via heat insulating pipes, the central pipe and the side pipes are in parallel, the side pipes are uniformly arranged outside the central pipe, the side pipes are separated from each other, a cross section of each side pipe is formed by three arcs with an equal arc length and an equal radius and connected sequentially to one another, edges of the side pipes are connected with outer wall surface of the central pipe, and an arc surface of the side pipes far from the central pipe is coaxial with the central pipe; and the cold storage pool (5) is parallel-connected to the chiller set.

10. The chiller set for a cold storage system according to claim 9, wherein the cold storage pool is connected with the chiller set via a three-way valve.

* * * * *